Sept. 26, 1944.  R. C. BERGVALL  2,359,079
ELECTRICAL DISTRIBUTION SYSTEM
Filed Aug. 29, 1941
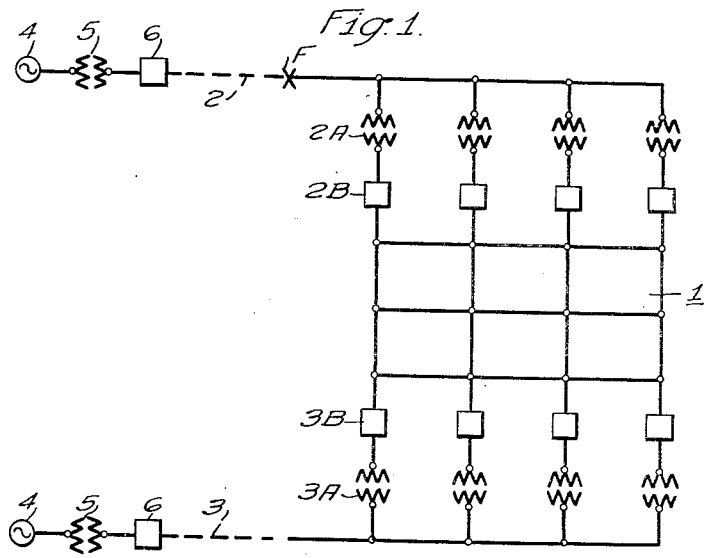
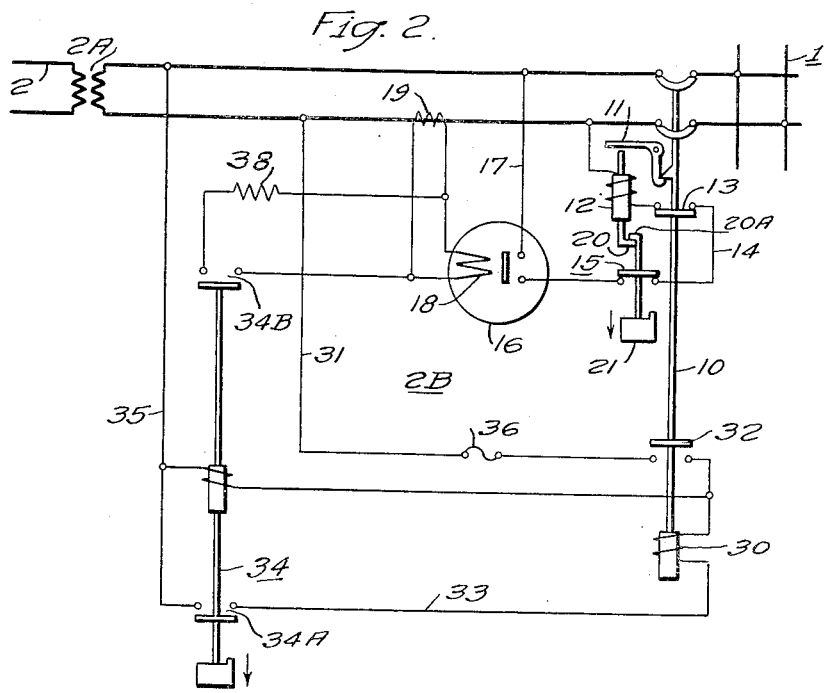
WITNESSES:
INVENTOR
Royal C. Bergvall.
BY
ATTORNEY Patented Sept. 26, 1944

2,359,079

UNITED STATES PATENT OFFICE 2,359,079

ELECTRICAL DISTRIBUTION SYSTEM

Royal C. Bergvall, Forest Hills, Pa., assignor to Westinghouse Electric & Manufacturing Company, East Pittsburgh, Pa., a corporation of Pennsylvania Application August 29, 1941, Serial No. 408,803

4 Claims. (Cl. 175—294)

This invention relates to electrical distribution systems and it has particular relation to electrical distribution systems of the type wherein a common distribution circuit or grid is supplied with electrical energy from a plurality of sources.

For optimum reliability, regulation and general performance in the distribution of electrical energy, it is conventional practice to supply a common distribution circuit or grid from a plurality of sources of electrical energy, such as feeder circuits. Each of the feeder circuits is connected to the distribution circuit or grid through a plurality of transformers and protectors. The purpose of the protectors is to disconnect a feeder circuit from a distribution circuit or grid when a fault occurs thereon. In addition, the protectors serve to connect a feeder circuit to the network circuit or grid when the feeder circuit is in condition to supply electrical energy to the network circuit or grid. For example, each protector may include a circuit breaker having a directional tripping relay which operates to trip the circuit breaker when the direction of flow of power is from the distribution circuit or grid to the feeder circuit. The circuit breaker also may include reclosing means effective to reclose the circuit breaker when the voltage on the associated feeder circuit is above a predetermined value. Electrical distribution systems of this type are generally termed primary or secondary network distribution systems.

Because of a desire for low cost equipment, or for other reasons, protectors may be provided which fail to discriminate reliably between faults occurring on the feeder circuits. For example, a directional tripping control may operate with incorrect directional selectivity a substantial part of the time if of a low cost design.

In certain installations, it is desirable to provide protectors which are not responsive to the direction of power flow therethrough. Such protectors may have overcurrent tripping relays. A protector controlled in this manner will trip in response to current flowing to a fault occurring either on the associated feeder circuit or in the distribution circuit or grid. Such a system may be desirable when the distribution voltage is so high that it is impracticable to permit distribution circuit or grid faults to burn clear in the customary manner. As a further example, the non-directional control may be desirable for installations wherein the total power available is insufficient to burn clear faults occurring on the distribution circuit or grid. In certain small distribution systems, the non-directional control may be additionally preferable from a cost standpoint.

When protectors are provided with substantially non-directional tripping controls such as overcurrent relays, the protectors fail to discriminate between faults occurring on the feeder circuits. For example, let it be assumed that a network distribution system has two feeder circuits. If a fault occurs on one of the feeder circuits, power is supplied to the fault from the sound feeder circuit through the network circuit or grid. Consequently, the protectors associated with the sound feeder circuit carry at least as much current as the circuits associated with the faulty feeder circuit. As a matter of fact, the former protectors generally carry more current than the latter protectors for the reason that they generally supply some current to loads connected to the distribution circuit or grid. From this brief explanation, it will be appreciated that when a fault occurs on one of the feeder circuits, a mixture of protectors associated with the two feeder circuits may trip. It is entirely possible that the protectors associated only with the sound feeder circuit may trip.

After a tripping operation, protectors associated with the faulty feeder circuit remain open for the reason that insufficient voltage is present on the faulty feeder circuit to operate the reclosing means of the associated protectors. The protectors associated with the sound feeder circuit which trip in response to current supplied to the faulty feeder circuit reclose for the reason that sufficient voltage is present on the sound feeder circuit. After reclosure, the protectors associated with the sound feeder circuit may again trip in response to current flowing from the sound feeder circuit to the faulty feeder circuit.

In accordance with the invention, protectors associated with a sound feeder circuit are prevented from tripping for a time sufficient to permit tripping of protectors associated with the faulty feeder circuit. This may be effected by temporarily desensitizing the tripping mechanism of the protectors associated with the sound feeder circuit after these protectors have once tripped or after they have reclosed.

It is, therefore, an object of the invention to provide an improved electrical distribution system.

It is a further object of the invention to provide a network distribution system having a network circuit supplied with electrical energy from a plurality of feeder circuits through protectors with means for temporarily desensitizing tripping mechanisms of protectors associated with a sound feeder circuit when a fault occurs on another feeder circuit.

It is another object of the invention to provide a protector for a network distribution system wherein the protector tripping mechanism is temporarily desensitized in response to an opening or closing operation of the protector.

Other objects of the invention will be apparent from the following description taken in conjunction with the accompanying drawing, in which:

Figure 1 is a schematic view in single line of an electrical distribution system; and Fig. 2 is a schematic view of a network protector embodying the invention.

Referring to the drawing, Fig. 1 shows a distribution circuit 1 which is supplied with electrical energy from a pair of feeder circuits 2 and 3. The distribution circuit 1 may represent a single electrical load, a loop circuit or any known distribution circuit. For the purpose of illustration, it may be assumed that the distribution circuit 1 is formed of a plurality of interconnected secondary mains to provide a secondary network distribution circuit which is commonly referred to as a grid.

The distribution circuit 1 may be supplied with any form of electrical energy such as direct current or alternating current. If alternating current is employed, the system may be a single phase or polyphase system as desired. For the purpose of illustration, it is assumed that the system illustrated in Fig. 1 is a single phase alternating current system operating at a frequency of 60 cycles per second.

The feeder circuit 2 is connected to the distribution circuit 1 through a plurality of network transformers 2A and a plurality of network protectors 2B. Similarly the feeder circuit 3 is connected to the distribution circuit 1 through a plurality of network transformers 3A and a plurality of network protectors 3B. Each of the feeder circuits is connected to an alternating current generator 4 through a feeder transformer 5 and a feeder circuit breaker 6. The feeder circuit breaker 6 may be of any standard construction. Desirably the feeder circuit breaker may be designed to trip in response to current flowing to a fault occurring on the associated feeder circuit. The feeder circuit breaker may be designed to reclose automatically a predetermined number of times and to lock out if the fault fails to clear within the reclosing cycle thereof. Such circuit breakers are well known in the art.

Each of the protectors 2B and 3B is designed to trip in response to the flow of current therethrough in excess of a predetermined value. It should be observed that such a protector is not directional in its tripping. In other words, a protector may trip in response to excessive current flowing to a fault on the distribution circuit 1 or on either of the feeder circuits. For example, let it be assumed that a fault F occurs on the feeder circuit 2. Current flows to the fault F from the sound feeder circuit 3 through the network transformers 3A, the protectors 3B, the distribution circuit 1, the protectors 2B, and the network transformers 2A. Consequently the current flowing through the protectors 3B which are associated with the sound feeder circuit 3 is at least equal to that flowing through the protectors 2B which are associated with the faulty feeder circuit 2. As a matter of fact, the current flowing through the protectors 3B generally is larger than that flowing through the protectors 2B for the reason that the sound feeder circuit 3 also supplies the loads connected to the distribution circuit 1.

Because of the distribution of current in the system following the occurrence of the fault F on the feeder circuit 2, a mixture of the protectors 2B and 3B may trip. As a matter of fact, it is possible that only the protectors 3B associated with the sound feeder circuit 3 will trip in response to the fault F on the feeder circuit 2. Such tripping of the protectors 3B is undesirable for the reason that the distribution circuit 1 should continue to receive electrical energy from the sound feeder circuit 3.

If one of the protectors 2B trips, generally it will not reclose for the reason that the voltage present on the faulty feeder circuit 2 usually is insufficient to operate the reclosing mechanism of these protectors 2B.

On the other hand, if a protector 3B trips in response to current flowing to the fault F, the protector will reclose for the reason that sufficient voltage is present on the feeder circuit 3 to operate the reclosing mechanism of the protectors 3B.

In order to prevent the repeated tripping of protectors associated with one of the feeder circuits when a fault occurs on the other feeder circuit, all of the protectors preferably are designed in such a manner that the tripping mechanism of the protectors associated with the sound feeder circuits temporarily decrease in sensitivity following the occurrence of a fault. Such a decrease may be effected in response to either an opening or a closing operation of each protector. A protector of this type is illustrated in detail in Fig. 2.

Referring to Fig. 2, one of the protectors 2B is illustrated. This protector includes a circuit breaker 10 for controlling the connection of the network transformer 2A to the distribution circuit or grid 1. The circuit breaker 10 includes a tripping latch 11 positioned for operation by a tripping solenoid 12. When the conditions are such that the circuit breaker 10 should be tripped, a tripping circuit is established for the tripping solenoid 12 which may be traced from one terminal of the secondary winding of the transformer 2A through the tripping solenoid 12, front contacts of a pallet switch 13 carried by the circuit breaker 10, a conductor 14, back contacts of a lock-out device 15, contacts of an overcurrent relay 16, and a conductor 17 to the remaining terminal of the secondary winding of the transformer 2A.

The overcurrent relay 16 may be of any conventional construction. As illustrated, the energizing winding 18 of the overcurrent relay 16 is connected for energization from the secondary winding of a current transformer 19 which is associated with one conductor extending from the secondary winding of the transformer 2A. Consequently, when an excessive current passes through the transformer 2A and the circuit breaker 10, the overcurrent relay 16 is actuated to complete a tripping circuit for the tripping solenoid 12.

In order to prevent repeated tripping of a protector associated with a sound feeder circuit, it is desirable that the tripping mechanism associated with the circuit breaker 10 be temporarily desensitized after an initial operation thereof. Such desensitization is provided by the lockout device 15 which is biased into contact closing position in any suitable manner, as by gravity. The lockout device 15 has a lug 20A which overhangs a lug 20 carried by the plunger of the tripping solenoid 12. Consequently, operation of the tripping solenoid 12 serves to open the contacts of the lockout device 15. Since these contacts are in the tripping circuit of the tripping solenoid 12, the lockout device prevents tripping of the circuit breaker 10 until the contacts are reclosed.

Reclosure of the contacts of the lockout device 15 are delayed by a timing device 21 associated with the lockout device. This delay is sufficient to permit the circuit breaker 10 to remain closed for a sufficient time to assure tripping of protectors associated with a faulty feeder circuit. As a specific example of timing, the overcurrent relays 16 generally are designed to operate in less than five seconds. Therefore, the lockout device 15 may be designed with a time delay of about five seconds. It is to be understood, however, that the times of operation of the lockout device and overcurrent relay may be varied as desired.

Closure of the circuit breaker 10 is effected in any suitable manner as by a closing motor or solenoid 30. When conditions are such that the circuit breaker is to be closed, an energizing circuit for the closing solenoid 30 is established which may be traced from one terminal of the secondary winding of the transformer 2A through a conductor 31, back contacts of a pallet switch 32 carried by the circuit breaker 10, the energizing winding of the closing solenoid 30, a conductor 33, front contacts 34A of a closing relay 34, and a conductor 35 back to the remaining terminal of the secondary winding of the transformer 2A.

When the circuit breaker 10 trips, an energizing circuit for the closing relay 34 is set up by closure of the pallet switch 32. By inspection of Fig. 2, it will be observed that the energizing winding of the closing relay 34 is connected across the secondary winding of the transformer 2A through the conductors 35 and 31 when the pallet switch 32 closes. The closing relay 34 may be designed to close its contacts 34A when the voltage applied thereto is in excess of a predetermined value such as 90% of its normal value. As previously explained, closure of the front contacts 34A of the closing relay 34 establishes a closing circuit for the circuit breaker 10.

Under certain conditions, the circuit breaker 10 may trip and reclose at frequent intervals. This is commonly termed a "pumping" action of the circuit breaker. To restrict pumping of the circuit breaker, a fuse 36 may be included in the closing circuit established for the closing solenoid 30. This fuse is designed to permit a predetermined number of immediately successive closures of the circuit breaker 10 without blowing. If the number of immediately successive reclosures exceeds a predetermined number, the fuse 36 blows and prevents further reclosure of the circuit breaker.

As previously pointed out, temporary desensitization of the overcurrent relay 16 may be effected by operation of the tripping mechanism associated with the circuit breaker 10. In certain cases, it may be desirable to effect this desensitization of the overcurrent relay 16 in response to a reclosure operation of the circuit breaker. Such desensitization also is illustrated in Fig. 2.

Referring again to Fig. 2, it will be observed that closure of a pair of contacts 34B serves to establish a by-pass or shunt across the energizing winding 18 of the overcurrent relay 16. For this reason, closure of the contacts 34B serves to desensitize the overcurrent relay. The degree of desensitization may be controlled as desired by including a suitable impedance 38 in the shunt circuit.

Closure of the contacts 34B for a predetermined interval in response to a closure operation of the circuit breaker 10 is effected in any suitable manner. In the specific embodiment of Fig. 2, the contacts 34B constitute auxiliary front contacts carried by the closing relay 34. Therefore, when the closing relay 34 operates to initiate a closure of the circuit breaker 10, the contacts 34B close to desensitize the overcurrent relay 16. In order to establish this desensitization of the overcurrent relay 16 for the necessary interval, the closing relay 34 may be provided with a time delay in its contact opening direction. For this reason, the contacts 34B remain closed for the duration of the time delay. The time delay of the closing relay 34 may be of the order discussed with reference to the lockout device 15.

It is believed that the operation of the invention is apparent from the foregoing description. Under normal conditions of operation, the distribution circuit or grid 1 receives electrical energy over both of the feeder circuits 2 and 3. Should a fault occur on the distribution circuit or grid 1, the protectors 2B and 3B trip. If the fault clears prior to the expiration of the reclosing cycles of the protectors 2B and 3B, the protectors close and remain closed to restore the system for normal operation. However, if the fault occurring on the distribution circuit or grid 1 is a permanent fault, the protectors associated with the distribution circuit trip and reclose until their fuses 36 blow. The system then remains out of operation until the fault is cleared and the protectors 2B and 3B are manually restored for further service.

Should a fault occur on one of the feeder circuits such as the fault F on the feeder circuit 2, the feeder circuit breaker 6 associated with the feeder circuit 2 trips. If the fault clears prior to the expiration of the reclosing cycle for the feeder closing circuit 6, the feeder circuit breaker 6 closes and remains closed to restore the feeder circuit 2 for further operation. However, if the fault F is a permanent fault, the feeder circuit breaker 6 associated with the feeder circuit 2 goes through its closing cycle and locks out.

The fault F also results in the flow of excessive current through the protectors 2B and 3B from the sound feeder circuit 3. This flow of current may result in the tripping of a mixture of the protectors 2B and 3B. As previously pointed out, the protectors 3B associated with the sound feeder circuit 3 may carry more current than the protectors 2B carry. For this reason, a fault occurring on the feeder circuit 2 may result in a tripping of all of the protectors 3B.

If any of the protectors 2B initially trip, such protectors remain open. This is for the reason that sufficient voltage is not present on the faulty feeder circuit 2 to operate the closing mechanism of the protectors 2B.

If the protectors 3B trip, these protectors reclose for the reason that sufficient voltage is present on the sound feeder circuit 3 to operate the closing mechanisms of the protectors 3B.

When the protectors 3B reclose, they remain closed for a predetermined interval determined by the time delay introduced by the lockout device 15 or by the closing relay 34. It should be understood that either the contacts 34B or the lockout device 15 may be employed alone to control the desensitization of the overcurrent relay 16 or both the contacts 34B and the lockout device 15 may be provided in each protector to assure the desensitization of the overcurrent relay 16 for the predetermined interval.

Since the protectors 3B which tripped in response to current flowing through the fault F, reclose and remain closed for a time sufficient to permit operation of the protectors 2B, those protectors 2B which initially fail to trip now trip to disconnect the feeder circuit 2 from the distribution circuit or grid 1. Consequently, the distribution circuit 1 continues to receive electrical energy from the feeder circuit 3.

When the fault F is repaired, restoration of voltage to the feeder circuit 2 results in reclosure of the protectors 2B. Such reclosure restores the complete system for further operation.

Although the invention has been described with reference to certain specific embodiments thereof, numerous modifications thereof are possible. Therefore, the invention is to be restricted only by the appended claims as interpreted in view of the prior art.

I claim as my invention:

1. In an electrical distribution system, an electrical circuit, a plurality of sources of electrical energy for supplying electrical energy to said electrical circuit, and circuit breaker means for connecting each of said sources of electrical energy to said electrical circuit, each of said circuit breaker means including a circuit breaker, trip means responsive in a predetermined normal manner to an abnormal condition of said electrical distribution system on either side of the circuit breaker for tripping the circuit breaker, closing means for said circuit breaker, and means temporarily effective in response to immediately successive tripping and reclosing operations of said circuit breaker for preventing an immediately successive normal tripping operation thereof.

2. In an electrical distribution system, an electrical distribution circuit, a plurality of feeder circuits for supplying electrical energy to said distribution circuit, and a plurality of circuit breaker units for connecting each of said feeder circuits to said distribution circuit, each of said circuit breaker units comprising a circuit breaker, overcurrent tripping means responsive to current passing through said circuit breaker for effecting a tripping operation of said circuit breaker, closing means responsive to the voltage of the associated feeder circuit for effecting a closing operation of said circuit breaker, and means responsive to at least one of said operations for temporarily decreasing the sensitivity of said overcurrent tripping means.

3. In an electrical distribution system, an electrical distribution circuit, a plurality of feeder circuits for supplying electrical energy to said distribution circuits, a plurality of transformers coupling each of said feeder circuits to said distribution circuit, and a circuit breaker unit for controlling the connection of each of said transformers to said distribution circuit, each of said circuit breaker units including a circuit breaker for connecting the associated transformer to said distribution circuit, overcurrent tripping means responsive to current passing through said circuit breaker for tripping said circuit breaker, closing means responsive to the voltage of the associated feeder circuit for closing said circuit breaker, and means responsive to a closing operation of said circuit breaker for temporarily decreasing the sensitivity of said tripping means.

4. In an electrical distribution system, an electrical distribution circuit, a plurality of feeder circuits for supplying electrical energy to said distribution circuits, a plurality of transformers coupling each of said feeder circuits to said distribution circuit, and a circuit breaker unit for controlling the connection of each of said transformers to said distribution circuit, each of said circuit breaker units including a circuit breaker for connecting the associated transformer to said distribution circuit, overcurrent tripping means normally responsive to current passing through said circuit breaker for tripping said circuit breaker, closing means responsive to the voltage of the associated feeder circuit for closing said circuit breaker, and means responsive to a tripping operation of said circuit breaker for temporarily incorporating a time delay in said tripping means for impeding normal operation of said tripping means for a predetermined time after a closing operation of said circuit breaker.

ROYAL C. BERGVALL.